Aug. 2, 1949.   J. H. LESLIE, II   2,477,757
THERMOSTATIC CONTROL

Filed Dec. 8, 1944   2 Sheets-Sheet 1

Inventor:
John H. Leslie II.
By Williams, Bradbury & Hinkle
Attorneys.

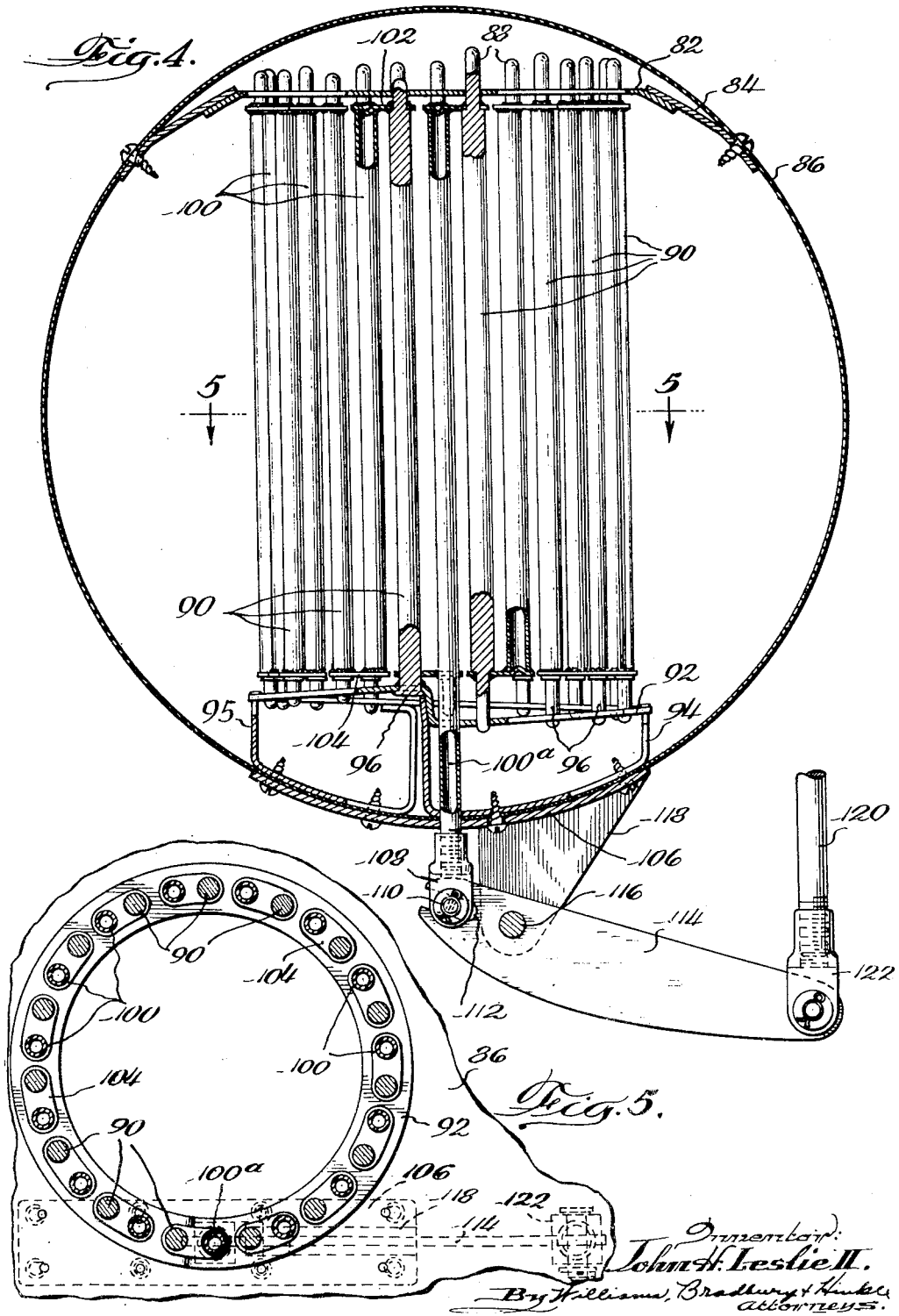

Patented Aug. 2, 1949

2,477,757

UNITED STATES PATENT OFFICE 2,477,757

THERMOSTATIC CONTROL

John H. Leslie, II, Winnetka, Ill., assignor to Stewart-Warner Corporation, Chicago, Ill., a corporation of Virginia Application December 8, 1944, Serial No. 567,174

2 Claims. (Cl. 297—12)

My invention relates generally to thermostatic control apparatus, and more particularly to temperature responsive means for producing mechanical movement, actuation of switches, and the performance of similar functions.

In controlling heating and similar apparatus, it is frequently desirable to have a thermostatic or temperature responsive device which will provide substantial movement and power for the operation of various controls of the heating system, such as the fuel and air supply regulating valves, switches, and other apparatus and devices for controlling or regulating the operation of the system. In many instances the operation of such heating system controls requires considerable power, so that to effect the control by the usual thermostat it is frequently necessary to have the thermostat operate a switch for controlling the supply of power to an electrically energized motor, such as a solenoid, rotary electric motor, relay, or the like.

To overcome the necessity of using intermediate electrical motor means, I have provided a temperature responsive device which will provide sufficient movement and power directly to operate such controls.

A further object is to provide a thermostatic device of relatively small overall dimensions, but which nevertheless is capable of producing movement of a part through a substantial distance in response to minor changes in temperature.

A further object is to provide an improved compact thermostat which responds rapidly to changes in temperature, and which may be easily installed in various types of heating systems.

A further object is to provide an improved temperature responsive device which is simple in construction, which may be economically manufactured, and may be installed with a minimum of effort.

Other objects will appear from the following description, reference being had to the accompanying drawings, in which:

Fig. 4 is a transverse sectional view of a fluid conducting duct showing a modified form of the temperature responsive device installed therein, portions of the latter being shown in section more clearly to illustrate the construction; and Fig. 5 is a transverse sectional view taken on the line 5—5 of Fig. 4.

Figure 1:
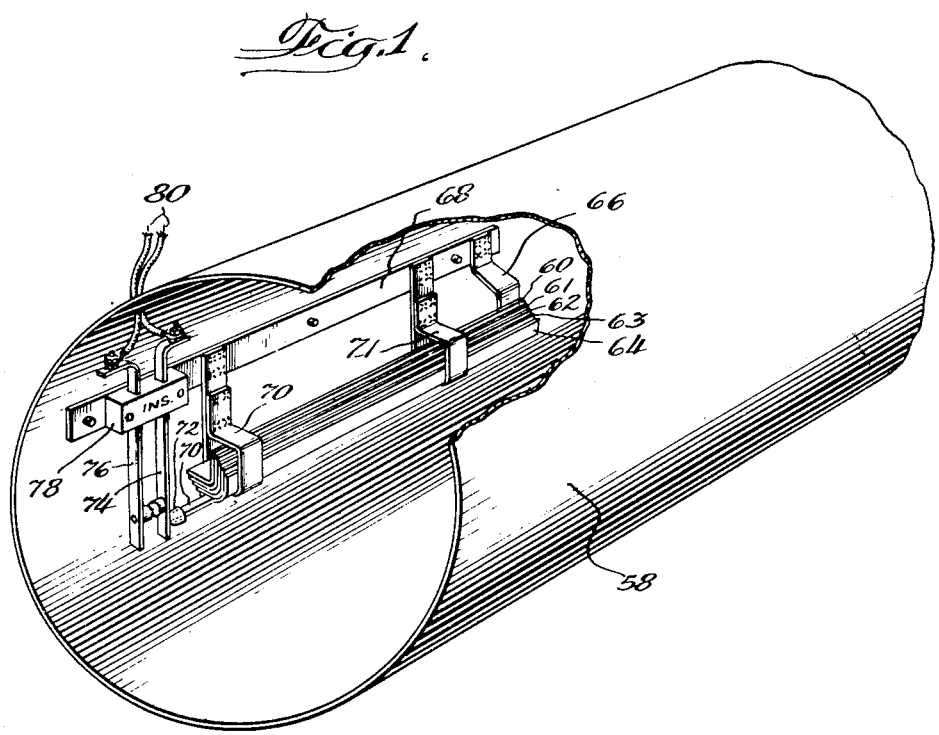
Fig. 1 is a perspective view of one form of thermostatic control, a portion of the duct in which the control is installed being broken away.
Figure 2:
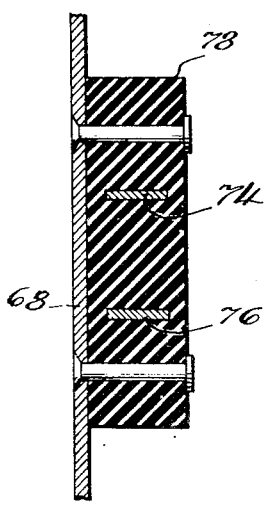
Fig. 2 is an enlarged horizontal sectional view of the switch contact arm supporting block shown in Fig. 1.
Figure 3:
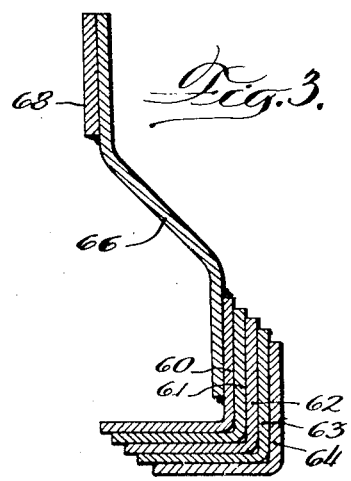
Fig. 3 is a fragmentary vertical sectional view showing the method of securing one end of the temperature responsive device of Fig. 1 to its support.

In Figs. 1 to 3, the thermostatic control is shown as being installed in a duct 58 through which flows air to be supplied to a space to be heated. The thermostatic responsive control comprises a plurality of angles 60, 61, 62, 63, 64, L-shaped in cross section, with the sides of the L of equal width. The even numbered angles are made of a metal or alloy having a high thermal expansion coefficient, while the odd numbered angles are of a metal having a low or negligible coefficient thermal expansion, such as invar. The innermost angle 60 is secured to a bracket 66 which is welded or otherwise suitably secured to a mounting strip 68, the latter being suitably secured within the duct 58. Also secured to the mounting strip 68 are a pair of hangers 70 and 71, which form supports for the angles 60 to 64, but through which the angles are readily movable.

The outermost angle 64 has an extension 70 provided with an insulating button 72 for engagement with a flexible switch arm 74. The switch arm 74 and its complemental less flexible switch arm 76 are secured in a block 78 of insulating material, which is likewise secured to the mounting strip 68. The switch arms 74 and 76 have the usual electric contact elements riveted or otherwise secured thereto, and are designed for connection of electrical conductors 80.

The opposite ends of the angles 61 and 63 are secured respectively to the ends of the two adjacent angles 60, 62, and 62, 64, so that the movement of the extension 70 of the angle 64 will be substantially the sum of the total expansion of the three angles 60, 62, and 64. Thus the effect of a change in the temperature of the air flowing through the duct 58 upon the movement of the extension 70 will be approximately the same as it would be if it had been attached to an angle three times as long as the angles 60, 62, 64. By interposing the Invar angles 61, 63, the overall length of the temperature responsive device may be approximately one-third of the overall length which would otherwise be required. Furthermore, it will be clear that if but a single angle were employed, there would be increased problems of adequate support of the portions of the angle intermediate its length, and the effect of the expansion of the mounting strip 68 due to changes in temperature would in a greater measure reduce the effective movement of the free end of the angle. Thus the device may be made very compact and still produce substantial movement of the actuating extension with but relatively small changes in temperature, making the device useful in apparatus which requires very sensitive temperature regulation.

When it is necessary or desirable that the thermostatic device respond very rapidly to slight changes in the temperature of the air flowing through the duct, a modified form of the device such as shown in Figs. 4 and 5, is preferably employed. In this modification a ring 82 welded to mounting lugs 84 is secured in the upper portion of a duct 86, the ring 82 having a plurality of perforations for the reception of the reduced diameter ends 88 of rods 90 made of Invar or similar metal or alloy. A somewhat similar ring 92 of generally helical conformation is secured at the bottom of the duct 86 by means of suitable brackets 94 and 95 which are fastened to the bottom of the duct 86. The ring 92 is suitably perforated for the lower reduced diameter end portions 96 of all except one of the Invar rods 90, there being suitable clearance between the end portions 96 and the apertures in the ring 92, so that the rods may move freely relative to the ring 92. There is similar clearance between the end portions 88 and the ring 82. One of the Invar rods 90 is riveted or otherwise suitably secured to the lower ring 92, as indicated at 96.

A plurality of hollow tubes 100 are arranged alternately intermediate the rods 90. The ends of the tubes 90 are rigidly secured respectively to the corresponding ends of adjacent rods 90 by connecting straps 102 and 104, the straps being preferably welded or otherwise rigidly secured to the rods 90 and tubes 100. The tube 100a, which is the last of the series, is longer than the other tubes 100 and passes freely through suitable apertures formed in the bracket 94, the duct 86, and a mounting bracket 106. The lower extremity of the tube 100a has a clevis 108 threaded thereto, a pin 110 through the clevis fitting in an open end slot 112 formed in an actuating lever 114. This lever 114 is pivoted on a pin 116 carried by an ear 118 of the mounting bracket 106, and at its free end has a rod 120 pivotally secured thereto as by means of a clevis 122.

With the parts in the position shown in Fig. 4, an increase in the temperature of the air flowing through the duct 86 will cause expansion of all of the tubes 100 and the expansion of each tube will be cumulatively added to the expansion of the other tubes, due to their rigid connections with the alternately intermediate Invar rods 90. In the embodiment illustrated in Figs. 4 and 5, the downward movement of the lower end of tube 100a will therefore be approximately fifteen times the expansion of a single one of the tubes 100. Since all of the tubes have their external surfaces exposed to the air flowing through the duct 86, and because of the fact that the tubes have relatively thin walls, it will be clear that their temperature will be maintained substantially the same as that of the air flowing through the duct 86, and that a change in temperature of such air flow will be practically immediately reflected in an expansion or contraction of the tubes 100, and hence in a multiplied movement of the lower end of the tube 100a. Since rods 90 are guided for free movement at both ends, the tubes 100 will be adequately supported against warping and lateral flexure, with the result that the movement of the lower end of the tube 100a will accurately represent the cumulative expansion of all of the tubes. Also because of the tubular construction of the expansible members 100, 100a, the device will be capable of exerting a substantial force for the operation of any control device connected to the rod 120, without any tendency to lateral bending or buckling. The device of Figs. 4 and 5 thus forms a simple and inexpensive thermostatic device which responds rapidly and accurately to very slight changes in temperature, and which is capable of delivering a substantial amount of energy for the operation of the controls or other mechanism which it is desired to operate in response to changes in temperature of the air flowing through the duct 86.

While I have shown and described particular embodiments of my invention, it will be apparent that numerous variations and modifications thereof may be made without departing from the underlying principles of the invention. I therefore desire, by the following claims, to include within the scope of my invention, all such variations and modifications by which substantially the results of my invention may be obtained through the use of substantially the same or equivalent means.

I claim:

1. In a thermostatic device, a plurality of relatively long elements L-shaped in cross section having a high thermal expansion coefficient with the sides of the L of equal width, a plurality of members shaped similarly to said elements having a low thermal expansion coefficient, said elements and members being alternately nested to form a stack, each member having one end directly joined to the corresponding end of the next adjacent element on one side and having its other end directly joined to the corresponding end of the next adjacent element on the other side, means for rigidly anchoring the free end of one of the two outer elements of said stack which do not have members secured to both ends thereof, an actuator operatively conneceted to the free end of the other of said two elements, whereby said actuator will be moved by its connected element a distance corresponding substantially to the cumulative change in length of all of the elements less the cumulative change in length of all of the members, and means for supporting said elements and members for relatively free thermal expansion movement in respect to one another.

2. In a thermostatic device, a plurality of relatively long elements L-shaped in cross section having a high thermal expansion coefficient with the sides of the L of equal width, a plurality of members shaped similarly to said elements having a very low thermal expansion coefficient, said elements and members being alternately nested to form a stack, each member having one end directly joined to the corresponding end of the next adjacent element on one side and having its other end directly joined to the corresponding end of the next adjacent element on the other side, a mounting strip, a bracket rigidly anchoring the free end of one of the two outer elements of said stack which do not have members secured to both ends thereof, to said mounting strip, an actuator operatively connected to the free end of the other of said two elements whereby said actuator will be moved by its connected element a distance corresponding substantially to the cumulative change in length of all of the elements less the cumulative change in length of all of the members, and hangers secured to said mounting strip supporting said elements permitting free thermal expansion movement of said elements and members.

JOHN H. LESLIE, II.

REFERENCES CITED

The following references are of record in the file of this patent:

UNITED STATES PATENTS

| Number | Name | Date |
|---|---|---|
| 987,664 | Adair | Mar. 21, 1911 |
| 1,726,068 | Hoeschen | Aug. 27, 1929 |
| 1,830,051 | Carroll | Nov. 3, 1931 |

FOREIGN PATENTS

| Number | Country | Date |
|---|---|---|
| 6,366 | Great Britain | 1893 |
| 84,438 | Germany | Dec. 9, 1895 |
| 102,538 | Great Britain | Dec. 14, 1916 |
| 206,526 | Great Britain | May 8, 1924 |
| 702,300 | Germany | Feb. 4, 1941 |